Nov. 18, 1952 M. KALFAIAN ET AL 2,618,706

MULTIPLEX COMMUNICATION SYSTEM

Filed Sept. 7, 1949 4 Sheets-Sheet 1

INVENTORS:
Aram Kalfaian
Robert E. McCoy

INVENTORS:
Meguer Kalfaian
Robert E. McCoy

INVENTORS:
Magnus Kalfaian
Robert E. McCoy

INVENTORS:
BY Megan Kalfaian
Robert E. McCoy

Patented Nov. 18, 1952 2,618,706

UNITED STATES PATENT OFFICE 2,618,706

MULTIPLEX COMMUNICATION SYSTEM

Meguer Kalfaian, Los Angeles, Calif., and Robert Edwin McCoy, Portland, Oreg.

Application September 7, 1949, Serial No. 114,446

8 Claims. (Cl. 178—50)

(Granted under the act of March 3, 1883, as amended April 30, 1928; 370 O. G. 757)

The invention described herein may be manufactured and used by or for the Government for governmental purposes, without the payment to us of any royalty thereon.

Our present invention relates to telegraphic communication, and more particularly to a system providing multiplex communication. Its main object is to provide a telegraph system through which a plurality of messages can be transmitted simultaneously, without increasing either the frequency bandwidth or the time required, beyond what ordinarily would be required for transmitting only one of said messages. Another object is to provide an improved automatic printing telegraph or teletypewriter system capable of multiplex message transmission.

In general, the various messages sent simultaneously according to our invention are distinguished by differences in the "quantum size" assigned to each of them. One message is conveyed by changing some parameter over a limited range in steps of a fixed size; for example, the D.-C. potential of a conductor may be raised or lowered by operation of a telegraph key, which connects or disconnects a battery. (The code used, the parameter changed, and the method of changing it are of no consequence for the immediate discussion.) Other messages sent at the same time are conveyed by changing the same parameter, cumulatively, in steps of different sizes. The various sizes of steps, or "quanta" (as they may be called by analogy with the Quantum Theory of M. Planck), are so related that the total corresponding to any particular combination of messages is distinctly different from the total corresponding to any other combination that might occur.

This "quantum-size multiplex" principle can be applied to telegraphy with manual keying, or to automatic printing telegraph systems. The latter application will be explained in detail for a system using a pulse-time code to designate the character to be printed. In this case the transmitter has a multiplicity of keys, each corresponding to a different character, and a distributor which closes a circuit through each key in turn. Operation of any particular key permits delivery of a pulse of voltage at a corresponding moment in the distributor cycle. Pulses from different transmitters are combined in such a way that each contributes to the total an amount of different size; and the total voltage is transmitted through a wire or radio link to a distant receiving point. There the received signal is separated into its constituent parts of different quantum size. Each part is applied to a corresponding automatic printer whose type-selecting circuits are so synchronized with the transmitting distributor that the character printed upon receipt of a signal pulse will correspond to whichever key originated the pulse.

Various embodiments of our invention are illustrated in the drawings.

*Simple example of quantum-size multiplex telegraphy*

Figure 1:
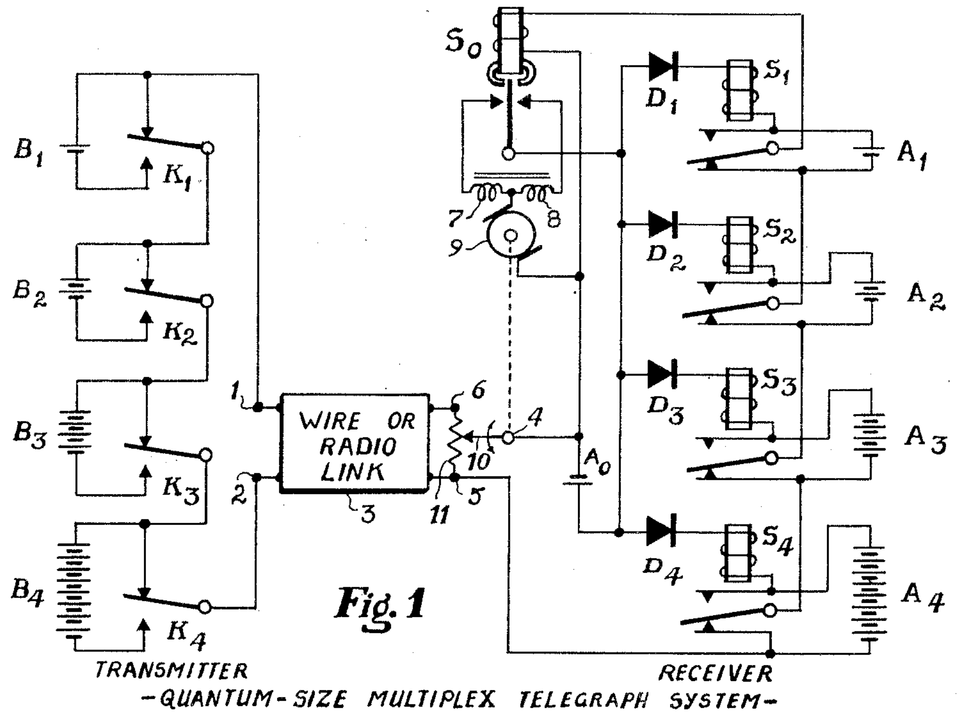
Fig. 1 shows schematically a simple four-channel quantum-size multiplex telegraph system.

Assuming that the multiplex telegraph system of Fig. 1 has been adjusted properly, it will be in a state of equilibrium when all keys and relay contacts are in the positions shown. One channel operates in the same manner as any other, and channel 2 may be taken as a typical example to explain the operation of the system.

When key K is depressed, it connects battery B2 into the circuit between sending-end terminals 1 and 2. Through the transmission means 3, which may be any convenient type of wire or radio link, the voltage between terminals 1 and 2 is reproduced between terminals 4 and 5, at the receiving end of the system. The ratio of voltage between terminals 4 and 5 to the corresponding voltage between terminals 1 and 2 is kept substantially equal to the ratio of voltages of corresponding batteries A2 and B2, by means which will be explained later.

At terminals 4—5, the voltage due to battery B2 is equal to the voltage of battery A2 which opposes it in the series circuit through battery Ao, rectifier D2 and the coil of relay S2. The net voltage acting in that circuit, due to battery Ao, causes a current sufficient to operate relay S2. This relay immediately pulls up its armature, connecting battery A2 in series with all the relays above it, and thereby neutralizes the effect of battery B2 on those relays. Thus the relays above S2 do not operate. Those below S2 do not operate either, because of the rectifiers in series with them. The combined voltage due to batteries B2 and Ao is less than that of battery A3; consequently the net voltage applied to rectifier D3 is in the direction for which the rectifier will not conduct readily; and little or no current passes through the coil of relay S3. Similarly, since battery A4 has a voltage even higher than A3, rectifier D4 prevents operation of relay S4. Thus when key K2 is depressed, only relay S2 is thereby caused to operate. The relay itself may act as a telegraph sounder, or it may have auxiliary contacts (not shown) which serve as the key in a local telegraph circuit.

In general, when key K*n* is depressed (*n* representing the channel identification number; in this case, 1, 2, 3 or 4), battery B*n* is connected and a corresponding voltage appears between terminals 4 and 5. Immediately afterward, relay S*n* operates and connects a substantially equal voltage (from battery A*n*) in series with all the relays above it. When key K*n* is raised, removing the voltage it had introduced previously, relay S*n* releases its armature and removes the opposing voltage from the other relay circuits. Except for the brief moment between movement of key K*n* and corresponding movement of the armature of relay S*n*, whatever voltage may be introduced by manipulation of keys in the various channels will be neutralized by opposing voltages introduced by action of the corresponding channel relays; and the net voltage applied to relay So will be substantially zero, so long as the system is properly adjusted. Relay So is purposely made so slow in action that momentary impulses hardly affect it; but it is sufficiently sensitive to be operated by a sustained voltage less than half that of battery A1.

If the voltage delivered at terminals 4—5 is a trifle too high in proportion to the corresponding voltage at terminals 1—2, channel relays S1, S2, etc., still operate correctly; but the voltage they provide by connecting A batteries in series with relay So is not quite large enough to balance the voltage between terminals 4—5. The difference then causes a current through the coil of relay So in a direction which tends to swing the armature of that relay to the right. If the unbalance exceeds a certain small limit, the right contacts of relay So will close, completing a circuit from battery Ao through field winding 8 and armature 9 of a reversible electric motor. This motor immediately starts to lower the tap 10 of voltage divider 11, thereby reducing the voltage between terminals 4 and 5 to a smaller fraction of the voltage delivered at terminals 6 and 5 by transmission means 3. When the unbalance has been reduced to a sufficiently small amount, relay So opens its right contacts and the motor stops. If an opposite maladjustment occurs, the voltage delivered at terminals 4—5 being slightly too low instead of too high, the voltage unbalance is reversed; and relay So, being polarized, pulls its armature left instead of right. If the unbalance exceeds a certain limit (depending on the sensitivity of relay So), the relay will close its left contacts, completing a circuit from battery Ao through field winding 7 and armature 9 of the motor. Then the motor raises tap 10 of voltage divider 11, thereby increasing the relative magnitude of the voltage between terminals 4 and 5, until the unbalance is substantially corrected and relay So opens its left contacts again. Thus voltage divider 11 will be adjusted automatically to the proper setting.

Since the selective operation of channel relays S*n* depends on voltage comparisons, the relation between voltages used in the various channels must be chosen with some care. The battery B*n* used at the sending end of the *n*th channel must have a voltage distinctly different from that of the corresponding battery in any other channel; and each total formed by adding the voltages of two or more of these batteries must be distinctly different from the totals for other such combinations. While there are innumerable proportions that would meet these requirements, it seems best to arrange the battery voltages in the proportion $Bn:B1::An:A1::2^{n-1}:1$. With this relation, if the voltages corresponding to all the different combinations of key positions are listed in order of magnitude, the difference between any two adjacent values will be the same, thus providing a uniform margin of safety for the voltage-selection devices at the receiving end which must distinguish between those different values.

Optimum voltages for battery Ao depends somewhat upon the sensitivity of relays. Preferably all the channel-selection relays S1, S2, etc., should have equal sensitivity; but each should be a little slower in action than the one below it (i. e., the one in the channel which uses next higher voltage). Minimum sensitivity of relay S*n*, in the *n*th channel, should be such that, even when voltage divider 11 is set too low by the maximum amount that might occur before correction would be initiated by relay So, relay S*n* will operate when only key K*n* is depressed. Maximum sensitivity of relay S*n* should be such that, even when voltage divider 11 is set too high by the maximum amount that might occur before correction would be initiated by relay So, relay S*n* will not operate in response to the voltage applied to it when all the keys above K*n* (i. e., those which control less voltage than does K*n*) are depressed simultaneously.

With voltages in the proportions recommended above, the requirements just stated mean that relay So must be sensitive enough to operate when the voltage across its coil is less than half the voltage of battery A1 (preferably much less); battery Ao should have a voltage at least half that of battery A1, but little (if any) greater than A1; and the net voltage required to operate relay S*n*, in the *n*th channel, should be approximately that of battery Ao minus half that of battery A1.

The circuit arrangement shown in Fig. 1 was chosen primarily for simplicity of explanation, and probably would not be the form chosen for any practical application. There are many different circuits which would accomplish the same functions; and possible substitutions of parts will be obvious to those skilled in the art. Usually, employment of a separate battery for each channel will be inconvenient. In such cases, it may be preferable to substitute the arrangement shown in Fig. 2 or Fig. 3 for the sending end of the system shown in Fig. 1. Then a single battery Bo (or any other convenient source of well-regulated voltage) can serve all channels.

Figure 2:
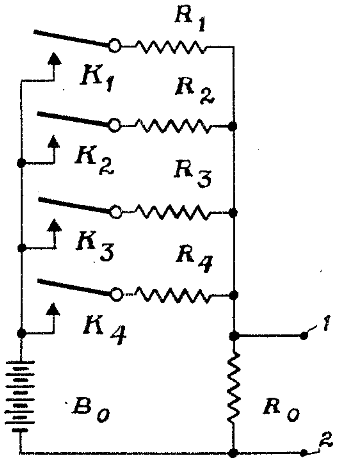
Figs. 2 and 3 show alternative circuits for the sending end of quantum-size multiplex telegraph system.

In Fig. 2, whenever key K*n* (in the *n*th channel) is depressed, it connects a corresponding resistor R*n* between battery Bo and load resistor Ro. A current flows through the closed circuit, producing between terminals 1 and 2 a voltage proportional to that current and to the resistance Ro. If several keys are depressed simultaneously, the resulting output voltage, expressed as a fraction of the voltage of battery Bo, will be $$\left(\sum_n 1/R_n\right)\Big/\left(1/R_o+\sum_n 1/R_n\right)$$

where the *n*-summation is taken for those channels in which the key happens to be down. By making Ro very much smaller than any of the other resistances, the $n$-summation in the denominator can be made negligible in comparison to the term 1/Ro; and the output voltage for any combination of keys depressed becomes practically the sum of the voltages which would be produced by depressing those keys one at a time. The maximum output voltage will be only a small fraction of the battery voltage in this case (the numerator is the same quantity considered negligible in the denominator), but can be restored to a useful magnitude by an amplifier included in transmission means 3. Resistances R$n$ should be chosen inversely proportional to the voltages of corresponding batteries B$n$ in the circuit arrangement of Fig. 1.

Figure 3:
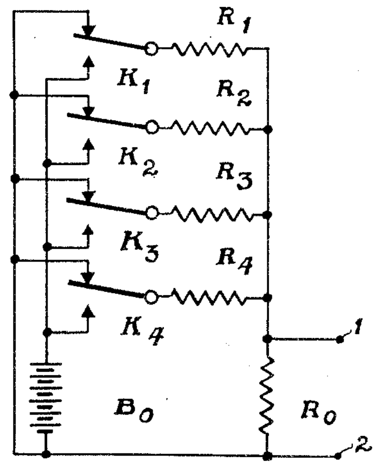

With a slight increase in complexity, the circuit of Fig. 2 can be modified to the more efficient form shown in Fig. 3. Here the upper contact of each key K$n$ is connected to the far end of battery Bo, while the rest of the circuit remains as in Fig. 2. This arrangement makes the combined resistance between terminals 1 and 2 independent of key positions (except for the moment when a key is moving between its two positions and both contacts are open). Resistance Ro may be increased indefinitely, and the maximum output voltage (with all keys down simultaneously) between terminals 1 and 2 need not be appreciably less than the voltage of battery Bo. In this case, the relative output voltage (as a fraction of the voltage of battery Bo) is $$\left(\sum_m 1/R_m\right)\Big/\left(1/R_o+\sum_n 1/R_n\right)$$

where the $m$-summation in the numerator is taken for only the resistances controlled by those keys which happen to be down, while the $n$-summation in the denominator is taken for the resistances in all channels, regardless of key position.

By suitable choice of resistances, the change of output voltage controlled by each key can be made any desired fraction of the voltage from common source Bo. For example, in a system with a total of N channels, if the resistance switched by the $n$th key (K$n$) is $$R_n=2^{1-n}R_o \text{ (for } n=1, 2, 3 \ldots, N)$$

then depressing key K$n$ will add to the output voltage a fraction $2^{n-1-N}$ of the voltage of common source Bo. For the Nth channel, this fraction is ½; and the maximum output, with all keys down, is a fraction $(1-2^{-N})$ slightly less than unity. If Ro were then removed or changed to an open circuit, keeping the other resistances unchanged, the maximum output could be increased to the full value of the voltage from common source Bo, and all other output voltages would be increased in the same proportion.

With manual operation of a system such as that shown in Fig. 1, the various telegraph keys may be manipulated at different speeds. Then there will be times when a key such as K4) in a large-quantum channel is depressed while the key (for example, K1) in a small-quantum channel remains up, or when the former key is raised while the latter is kept down. At the receiving end of the system, action of the relay (S4) in the large-quantum channel will prevent any sustained response by the relay (S1) in the small-quantum channel; but during the time required for the former relay to act, the latter will receive a brief impulse tending to move its armature. If relay S1 is relatively slow compared to relay S4, as recommended previously, this brief impulse will not produce enough motion to separate the closed contacts of relay S1. Alternatively, all channel relays (S1, S2 etc.) may be made equally fast—much faster than the hand on any key, and much faster than the receiving equipment they control. Then, although the relay in a small-quantum channel), such spurious responses will of the movements of keys in larger-quantum channels (when the other key moves to a position opposite from that of the key in the small-quantum channel), such suprious responses will be too brief to have any appreciable effect on the relatively slow equipment which the relay controls.

With automatic operation, all keys (or their equivalents in the automatic sending apparatus) can be synchronized. Then any transient disturbances due to key operation occur at regular intervals, and the receiving equipment can be arranged to ignore them. Such arrangements are common practice in automatic printing telegraph machines or teletypewriters, which are often so adjusted that either the receiving equipment itself or an associated repeater uses only the middle portion of each signal pulse, discarding the beginning and end (which are more liable to suffer distortion before reaching their destination). Accordingly, fast relays may be used in all channels with automatic senders and receivers; and the middle-selecting arrangements which tend to eliminate errors due to distortion will serve also to eliminate crossfire between channels due to the finite time required for relay operation.

*Multiplex teletypewriter transmitter circuit*

Figure 4:
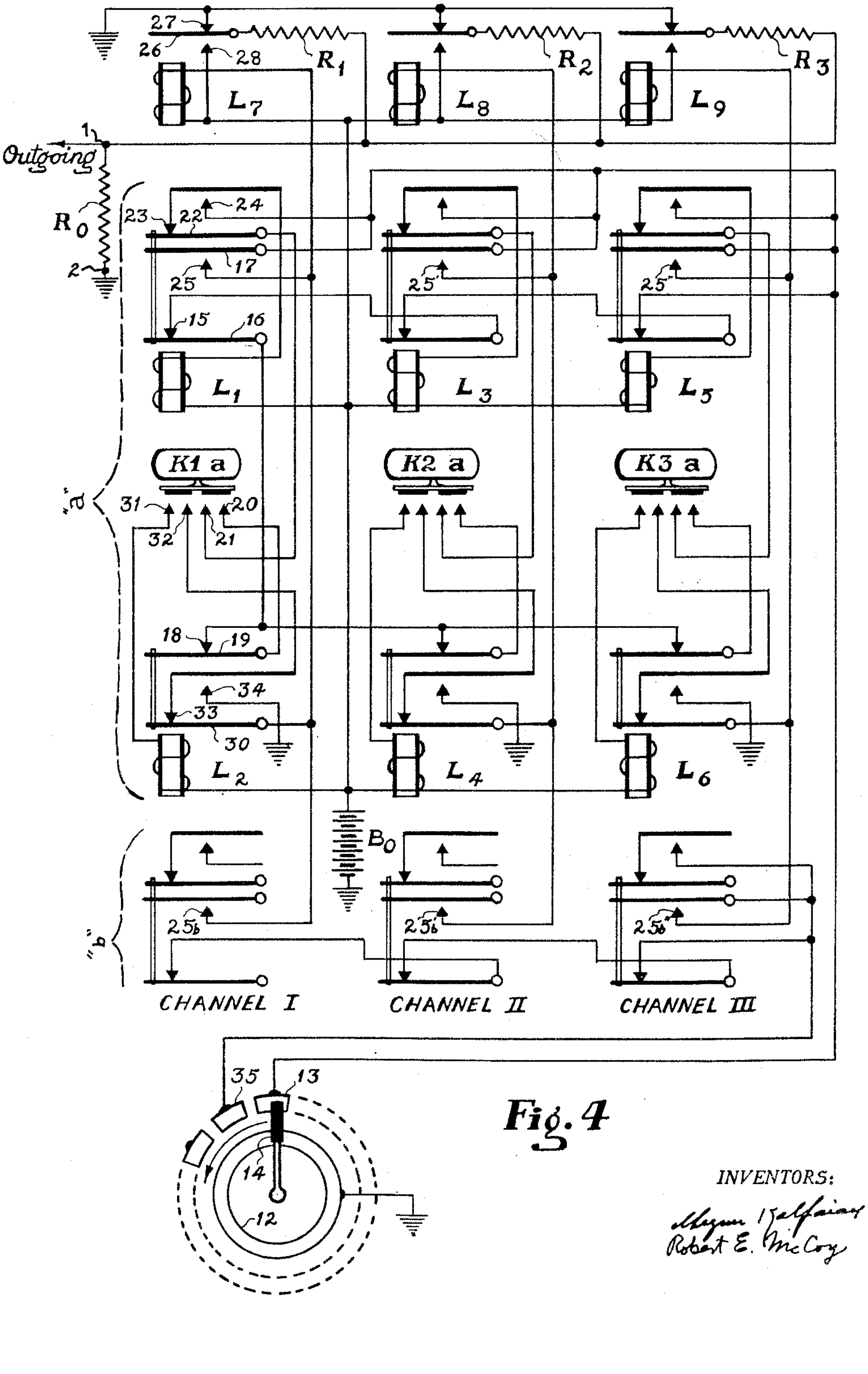
Fig. 4 shows schematically the sending end of a multiplex teletypewriter system.

Fig. 4 shows a partial schematic diagram of the transmitter circuits in a three-channel multiplex teletypewriter system. For clarity in the drawing, only the circuits used to transmit the character *"a"* in each channel are shown completely. Similar arrangements of wiring and relays, corresponding to those marked out by dashed brace *"a,"* are provided for each key in the keyboard of a transmitter. The entire arrangement indicated by Fig. 4 might be substituted for the transmitter of Fig. 1, just as those shown in Fig. 2 and Fig. 3 might be substituted, by a transfer of connections at the corresponding terminals 1 and 2 of each transmitter.

Operation of the system will be explained for a typical example in which the *"a"* key (K1*a*) of channel I has been depressed. Moving this key (or the *"a"* key in any other channel) has no effect elsewhere until a time determined by a scanning element or distributor. Many different types of scanning devices known to the art could be used without altering the character of our invention; but for simplicity of explanation a mechanical type is shown in Fig. 4. When rotating brush 14 reaches commutator segment 13, it connects that segment to grounded slipring 12, thus applying a ground connection to various circuits associated with the character *"a"* in all channels of the transmitter. Said ground connection from segment 13 passes in series through normally closed contacts 15 and 16 of relay L1, and corresponding contacts in relays L3 and L5 (one relay in each channel); through normally closed contacts 18 and 19 of relay L2; through contacts 20 and 21 of the depressed key K1*a*; and through normally closed contacts 22 and 23 of relay L1 to the coil of relay L1. Since one end of each relay coil is connected to the positive terminal of battery Bo, grounding the free end of the coil energizes the relay, causing it to pull down its armature and moving contacts. Thus, in the present example, relay L1 is energized. If key K2*a* also were depressed at this instant, there would also be a ground connection established through corresponding contacts of relay L4, of "*a*" key K2*a* and of relay L3, to the coil of relay L3, energizing it also and causing it to pull its armature down. In general, whenever commutator segment 13 receives a ground connection from the rotating brush 14, provided that at such instant there is an unbroken series connection through contacts 15 and 16 of relay L1 and their counterparts in other channels, one or more of relays L1, L3, L5 will be operated if the corresponding key K1*a*, K2*a*, K3*a* is depressed. If however, one of the "*a*" keys is depressed after operation of the corresponding relay in another channel (for example L1), the series connection through contacts 15 and 16 is already broken; and the last said key will be ineffective in operating its associated relay until the next distributor cycle. This blocking action makes sure that if several channels transmit pulses at the same time in the distributor cycle, all these pulses will begin at substantially the same instant. In order to prevent mutual blocking action among keys depressed before a ground connection is established at segment 13, contacts 15 and 16 are adjusted to open after contact 23 makes connection with the contact 24 leading to segment 13. Another necessary adjustment is that contact 23 should open its circuit through contact 22 only after establishing connection with contact 24. This is to ensure that the armature motion started by energizing relay L1 through contacts 22, 23 will be completed. However, such operating conditions may be obtained in various ways. For example, it may be arranged that, once the relay is energized, the initial momentum of the armature will be sufficient to maintain its downward motion to secure a self-locking position even though the electric circuit is broken before the armature completes its travel.

When relay L1 has pulled down its armature, contact 25 is connected to segment 13 through contact 17. The coil of relay L7, receiving a ground connection through contact 25, is energized. Relay L7 pulls down its armature, and contact 26, which shifts the connection of one end of resistor R1 from ground (contact 27) to the positive end of battery Bo, through contact 28. Consequently a new potential is established across the output load resistor Ro. The change at this time represents only the quantum size of channel I, since we have assumed other channels idle for the moment. If other channels were active too, resistor R2 might be switched by relay L8 of channel II, or resistor R3 by relay L9 of channel III, as relays L7—L9 take place of keys K1—K3 in Fig. 3. In any case, the new potential across Ro remains constant while the operated relays remain energized; and their release is determined by moving brush 14 of the distributor, when it passes away from segment 13 (for "*a*" keys; or away from corresponding other segments for other keys). Accordingly, the voltage across Ro may be utilized either for direct transmission or to modulate a carrier wave in any known manner.

To prevent repetition of the same character if a key is held down longer than the time of a complete scanning revolution of brush 14, a supplemental relay may be provided for each key, as illustrated by relays L2, L4, L6. These relays may be omitted if it is felt that in practice the depressed period of any key will not substantially exceed a complete scanning period of rotating brush 14.

Continuing with our example: we had assumed relay L1 is energized. Thus contact 25 has a ground connection from contact 17, and applies this ground through the normally closed contacts 30, 33 and through the now closed contacts 31, 32 of key K1*a* to the coil of relay L2. Then relay L2 pulls down its armature, which establishes a holding connection through contacts 33 and 34, the latter being grounded. Consequently, relay L2 remains energized (after L1 has operated) as long as key K1*a* remains depressed, and prevents any further operation of relay L1 after L1 is de-energized as brush 14 leaves segment 13. An open circuit for this purpose is established by the now open contacts 18 and 19 of relay L2. When key K1*a* is released, contacts 31 and 32 open the coil circuit of relay L2, which immediately releases its armature and reconditions the circuit connections of the key K1*a*, ready for future operation as described above.

In order to indicate the circuit arrangement relative to the relays associated with other keys of the teletypewriters, the lower part of Fig. 4 includes contacts of relays for keys K1*b*, K2*b* and K3*b*, which relays correspond to the relays L1, L3, L5 for keys K1*a*, K2*a* and K3*a*. These relays are connected to commutator segment 35, instead of to segment 13; but they are connected to relays L7, L8, L9 in exactly the same manner as their counterparts L1, L3, L5. Other connections between these relays, their keys, and the counterparts of relays L2, L4, L6, are not shown; but they would be similar to the corresponding connections among the circuit elements associated with the character "*a*."

It may be noted from the arrangement in Fig. 4 that a pulse will be transmitted each time rotating brush 14 comes to a segment that activates the relays in the circuits of one or more depressed keys. At the receiving end a similar rotating brush, like 14, will be operated in synchronism; and each time a pulse is received, the position of that brush (corresponding directly to the position of brush 14 at the same moment) will determine what character is to be printed. By the quantum size principle, as already explained, the size of the pulse determines in which channel or channels the printing shall take place. There are many known ways of synchronizing the rotating brushes (or equivalent devices that might be substituted for them). For example, signals of predetermined strength may be transmitted at regular intervals through circuits connected to an additional commutator segment exposed to brush 14, at the transmitting end of the system. Such arrangements are too well known to need explanation here.

*Receiving circuits, or "translator"*

In order to utilize devices previously proven useful, it is contemplated here to incorporate at the receiving end a cathode ray tube that has been developed for use with pulse code modulation. A general description of this tube is given in an article by R. W. Sears, "Electron beam deflection tube for pulse code modulation," Bell System Technical Journal, vol. 27, pp. 47–57; January 1948.

Figure 5:
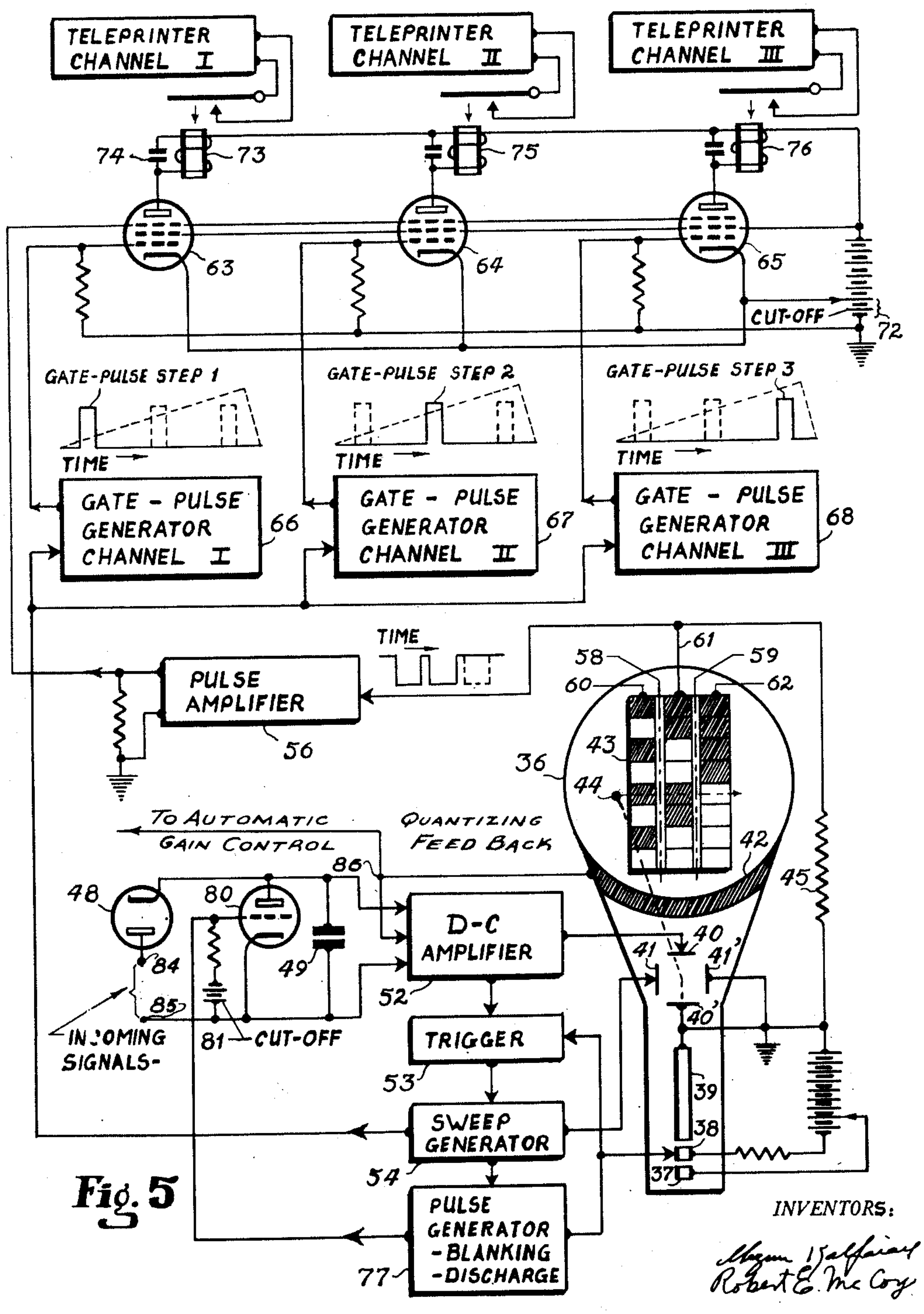
Fig. 5 shows schematically an alternative circuit for the receiving end of a system in accordance with our invention.

Fig. 5 shows a receiving circuit including a cathode ray tube 36 of the special type just mentioned. In this tube, cathode 37 emits electrons in a beam whose intensity is controlled by the potential of electrode 38. The beam passes through focusing electrode 39, then between two pairs of deflection plates: 40, 40′ for vertical deflection, and 41, 41′ for horizontal deflection. Continuing along the tube, the beam passes through the open center of secondary-electron collector anode 42. Most of the beam passes between two of the horizontal wires of a stabilizing grid (not shown in Fig. 5), although some of the beam electrons strike one of those wires and release secondary electrons which are collected by anode 42. As explained in the aforementioned reference and in U. S. Patent No. 2,473,691 (issued to Larned A. Meacham, June 21, 1949), the signal produced by these secondary electrons is used to ensure that any changes in vertical deflection of the beam will occur only in steps of a predetermined size corresponding to the spacing of wires in the stabilizing grid. A masking plate (not shown in Fig. 5) either stops the beam or allows it to pass onward and reach the target anode 43, depending on the transverse position of the beam when it reaches the masking plate. Shaded areas on anode 43 represent the parts exposed to the beam, while the unshaded areas represent portions which the beam never can reach. Whenever beam 44 reaches target anode 43, current flows through resistor 45. By applying appropriate voltages to deflection plates 40, 40′ and 41, 41′, the beam may be placed at a definite vertical level and swept horizontally across the tube; then the voltage developed across resistance 45 will consist of a series of pulses and spaces, arranged in a sequence corresponding to the pattern of shaded and unshaded areas on target anode 43. This sequence is different for each step of vertical position allowed by the stabilizing grid, and is chosen to represent a combination of different-sized quanta whose total corresponds to the vertical distance of that row from the bottom of target anode 43. For the simplified example shown in Fig. 5, quantum sizes assigned to the three columns of the shading pattern have the proportion 1 : 2 : 4. In general, the quantum size would be doubled for each additional column; and the number of rows would double each time a column was added.

Figure 6:
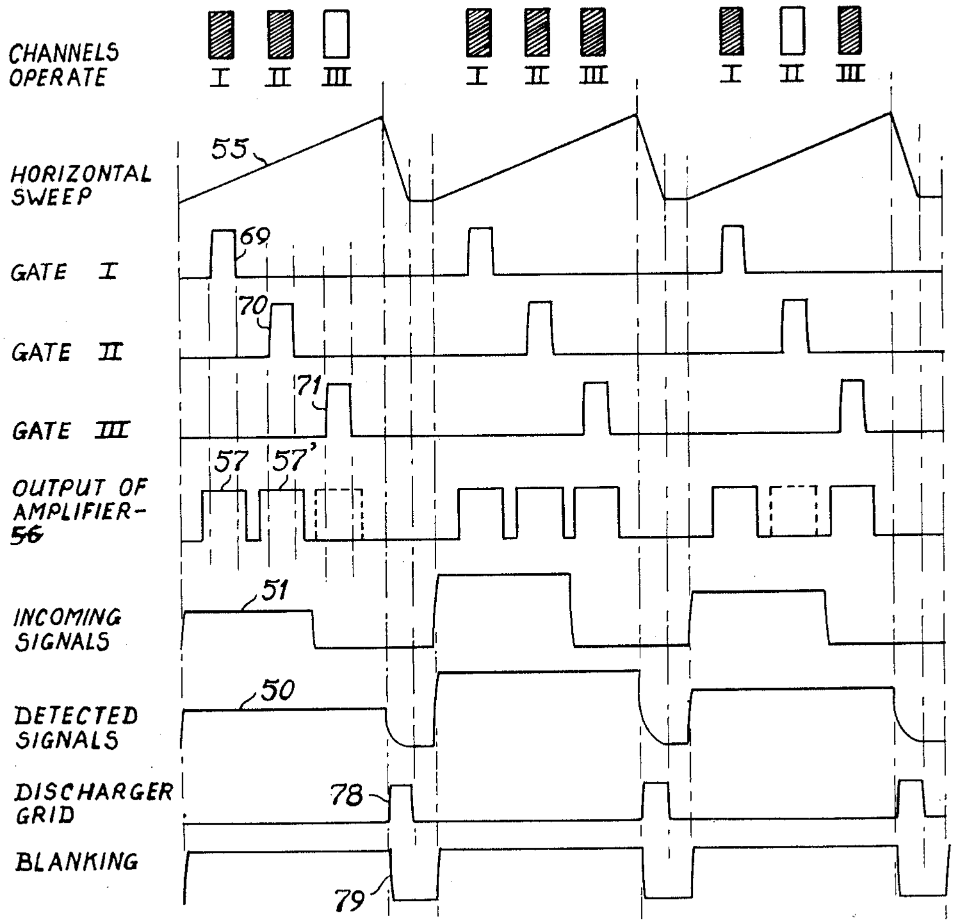
Fig. 6 shows waveforms of voltages at various points in the circuit of Fig. 5.

Referring now more particularly to the system embodying our invention, we may for example assume that the signal pulses are reproduced at the receiving end of the system as a unidirectional voltage like waveform 51 of Fig. 6, and are applied between terminals 84 and 85 (say by connecting these terminals to terminals 4 and 5 of Fig. 1), making terminal 84 positive. Then diode 48 conducts, at the beginning of each pulse, until capacitor 49 has been charged to the peak voltage of the pulse. Capacitor 49 remains charged for a fixed interval of time, as shown by waveform 50 in Fig. 6, even if the signal pulse ends sooner, as shown by waveform 51. Its steady potential is amplified by D.-C. amplifier 52 and applied to vertical deflection plate 40 of cathode ray tube 36, thereby controlling the vertical angle of the beam 44. In the event that the transmitted signals are transmitted by amplitude modulation of a carrier wave, the received carrier wave may be applied to terminals 84 and 85 without previous demodulation. Then diode 48 will serve as detector, rectifying the applied voltage and charging capacitor 49 to substantially its peak value during the first high-frequency cycle; but the storage of charge in capacitor 49 through diode 48 still serves the same purpose. In either case, each signal pulse received from the distant transmitter will cause deflection of the beam 44 to a height corresponding to the pulse amplitude.

Whenever a signal pulse reaches capacitor 49, a sudden change of voltage is applied, either directly or through amplifier 52, to trigger circuit 53, which promptly releases sweep generator 54 from its normal state of quiescence. The sweep generator produces a voltage which rises gradually at a substantially uniform rate, then subsides rapidly, as shown by waveform 55 in Fig. 6. This voltage is applied to horizontal deflection plate 41 of cathode ray tube 36, causing the beam 44 to sweep horizontally across target 43. When the beam passes over one of the areas shaded in Fig. 5, target anode 43 conducts, drawing current through resistor 45 and producing a voltage pulse which is amplified by pulse amplifier 56. With the beam in the vertical position illustrated, the output of the amplifier 56 would consist of two pulses during the first two-thirds of the sweep. These pulses (57, 57′ in Fig. 6) are destined for teleprinter channel I and channel II, respectively.

Operation of the system could be simplified by dividing target anode 43 into three electrically separate sections (or as many sections as there are channels) along vertical lines 58, 59. Each section then could be connected through its own output terminal 60, 61, or 62, and a separate pulse amplifier to the corresponding teleprinter; but using the cathode ray tube in the form described by Sears, an external switching arrangement must be provided to distribute the pulses. Such an arrangement is shown in the upper half of Fig. 5, where a separate tube is provided to serve as a gate for each channel.

Output pulses from amplifier 56 are applied simultaneously to one control grid in each of the gate tubes 63, 64, 65. Voltage from sweep generator 54 is applied to pulse generators 66, 67, 68, each of which generates a single pulse when the sweep voltage rises to a critical value. Circuits suitable for these pulse generators are shown in Fig. 8 and Fig. 10 of an article by Britton Chance, "Time modulation," Proceedings of the I. R. E., vol. 35, pp. 1039–1044; October 1947. For each pulse generator the critical value is made different, so that the pulse generators act in sequence, producing pulses as shown in Fig. 6 by waveforms 69, 70, 71, each of which is applied to one control grid (preferably the first control grid) of the corresponding gate tube 63, 64 or 65.

Due to the extreme negative bias applied to the control grids of gate tubes 63—65 from voltage source 72, anode current flows only when positive pulses are applied to both control grids simultaneously. For example, pulse 57 from amplifier 56 causes anode current in tube 63 while pulse generator 66 is delivering gate pulse 69. The resulting pulse of anode current operates relay 73, either directly or by charging capacitor 74 which subsequently discharges through the relay coil, thus maintaining a current long enough to ensure relay operation. Similarly, pulse 57′ from amplifier 56 causes anode current in tube 64 during gate pulse 70, and so operates relay 75. If there is no output from amplifier 56 during a gate pulse (as in the case of gate pulse 71, in the first sweep cycle of Fig. 6), the corresponding relay (76) does not operate. Thus when beam 44 sweeps across target anode 43, gate tubes 63—65 operate relays corresponding to the shaded areas at that level on the target anode.

When the sawtooth voltage from sweep generator 54 reaches its peak level, it actuates pulse generator 77, which then generates two pulses as shown by waveforms 78 and 79 in Fig. 6. The former, a short positive pulse, is applied to the control grid of discharger tube 80, where it overcomes the fixed negative grid bias from voltage source 81, and allows the anode of tube 80 to draw current. This current discharges capacitor 49 very rapidly: and by the time tube 80 becomes non-conductive again, at the end of pulse 78, the voltage across capacitor 49 is below the level of the smallest signal pulse that might be received subsequently.

Simultaneously with the action just described, output of pulse generator 77 is applied to trigger circuit 53, where it reverses the action of the previous signal pulse, causing sweep generator 54 to revert to a quiescent state in preparation for the next signal pulse. Subsidence of the voltage (sawtooth wave 55) from sweep generator 54 ends about the same time as the discharger pulse 78.

The other pulse produced by pulse generator 77 has negative polarity, as shown by waveform 79 in Fig. 6. This "blanking" pulse is applied to the intensity control electrode 38 of cathode ray tube 36, and substantially stops the beam current, not only during the discharger pulse 78 but also for whatever time may elapse until sweep generator 54 is released from its quiescent state upon arrival of the next signal pulse. Strictly speaking, the beam is normally cut off by a fixed negative bias, and is pulsed on or "unblanked" for the duration of the rising part of the sawtooth wave; and the negative blanking pulse is really a combination of the fixed negative bias with positive unblanking pulses that precede and follow the blanking period.

Beam blanking prevents spurious output signals from reaching relays 73, 75 or 76; but that is only a minor consideration, since any pulses produced by beam 44 while retracing its horizontal path would be too brief to cause relay operation. The major purpose of blanking, as suggested by Sears in the reference mentioned above, is to disable the vertical-deflection stabilizing system, by interrupting the "quantizing feedback" from collector anode 42, which otherwise would oppose any change of vertical deflection due to the next signal pulse. With the arrangement we have illustrated, where the end of a blanking pulse depends on circuit actions initiated by the next signal pulse, unblanking of the beam will be delayed slightly after the start of each signal pulse, thus allowing vertical deflection of the beam to be established according to the magnitude of the signal pulse before the beam current rises to its operating value.

Besides compensating for irregularities in tube characteristics and possible disturbances due to noise voltage, the quantizing feed-back is strong enough to compensate for minor variations in gain or attenuation along the way between transmitter and receiver. Like the relay arrangement shown in the receiver of Fig. 1, the deflection system with quantizing feed-back is practically unaffected by variations that change the received voltage less than about half the smallest increment to which it should respond. Also like the receiver in Fig. 1, it provides a signal suitable for automatic gain control: the D.-C. component of quantizing feed-back, which is available as a current from terminal 86, or as a voltage between terminals 86 and 85. To use the form of automatic gain control shown in Fig. 1, terminal 85 and a terminal (such as 86) having a fixed potential in Fig. 5 are connected to the coil of relay So in Fig. 1, with the addition of a suitable D.-C. bias such as that provided by battery Ao, while terminals 4, 5 of Fig. 1 are connected to terminals 84, 85 of Fig. 5 (instead of to the receiver arrangement to their right in Fig. 1). Then relay So will operate whenever necessary, causing the reversible motor to move arm 10 on voltage divider 11, as previously explained, until the net transmission gain or loss is adjusted well within the range that will allow correct operation of the system in Fig. 5.

The circuit arrangement shown in Fig. 5 is suitable as an alternative to the simpler arrangement shown in the right half of Fig. 1, for the receiving end of the telegraph system, if the sending end of the system in Fig. 1 is replaced by the arrangement shown in Fig. 4, or if the keys shown in Fig. 1 are operated by some other form of automatic transmitter. Of course, the teleprinters shown in Fig. 5 must be adapted to the character-designation code used by the corresponding transmitters.

If the arrangement shown in Fig. 4 is compared to that in Fig. 3, it may be seen that resistors Ro, R1, R2, and R3, battery *Bo* and output terminals 1, 2, are identical in both, while the contacts of relays L7, L8 and L9 in Fig. 4 correspond respectively to those of keys K1, K2 and K3 in Fig. 3. Fig. 1, Fig. 2 and Fig. 3 show keys functioning as switches in the main transmitting circuits; these switches might be operated by direct manual force, as the original Morse telegraph; or they might be actuated by magnetic forces, as in the first "telegraph repeaters" (relays). Fig. 4 shows keys that would be manually operated in the same manner as those of a typewriter keyboard. These keys act as switches too, but their control of the transmitted signal is indirect, involving at least two relays and a distributor. By pressing the appropriate key in Fig. 4, an operator can determine which character is to be transmitted next; but the exact timing of the coded signal to represent that character is determined automatically by the distributor and other circuit elements between the key (e. g. K1*a*) and the relay (e. g. L7) that finally performs a switching operation corresponding to the operation of a key (e. g. K1) in Fig. 3.

On the coarse scale of time corresponding to character selection, each channel operates independently; but on the fine scale used for coding purposes, the channels are synchronized, either by use of a single distributor to serve all channels (as shown in Fig. 4) or by use of separate distributors with appropriate synchronizing means. Thus the transmitted pulses originated by different channels either overlap completely or occur at distinctly different times; and one pulse never begins or ends in the middle of another. This feature is almost essential for proper operation of such receiving equipment as that shown in Fig. 5, where errors might occur unless overlapping pulses began at very nearly the same instant.

While we have described particular embodiments of our invention, numerous substitutions of parts, adaptations and modifications are possible without departing from the spirit and scope thereof. What we claim is:

1. A multiplex telegraph system comprising the following: A plurality of telegraph keys each controlling a different voltage which it can insert in the transmission circuit; means for combining additively the voltages inserted by the various keys; means for reproducing the combined total voltage at a distant receiving point; a plurality of voltage-sensitive means each responsive to voltage changes of a different magnitude corresponding to the voltage controlled by one of the telegraph keys; switching means controlled by each voltage sensitive means whereby it applies a compensating voltage to those voltage-sensitive means responsive to smaller voltage changes, said compensating voltage being chosen to neutralize the effect of the voltage change to which its controlling means is responsive; and means for indicating the response of each voltage-sensitive means.

2. A multiplex telegraph system wherein each of a plurality of telegraph keys can control a separate responsive means at a distant point through a single transmission means, said system comprising the following: A voltage source; coupling means between the voltage source and a common transmission means, said coupling means having a plurality of branches controlled by different telegraph keys and each designed to produce a different increment of voltage at the common terminals when the corresponding key is operated; transmission means to reproduce at a distant point the total voltage applied to its input terminals through said coupling means; a plurality of polarized voltage detectors at the distant point; sources of bias voltage for these detectors, said bias voltages corresponding to the voltage increments controlled by the keys at the sending end of the system; switching means controlled by each voltage detector whereby the bias applied to each detector responsive to a smaller increment of voltage is altered to compensate for the effect of any increment to which the larger-voltage detector responds, thus preventing sustained response by any voltage detector except to voltage increments of the size controlled by the corresponding key.

3. In a multiplex telegraph system of the type mentioned in claim 2, where various magnitude-selective detectors respond to different-sized quanta composing the received signal, means for automatic adjustment to compensate for possible variations in transmission loss, said means comprising the following: switching means connected to a local power source and controlled by the magnitude-selective detectors to build up a synthetic signal equal to the received signal normally required to actuate those detectors; an auxiliary polarized detector actuated by the difference between the received signal and this synthetic signal; and voltage-ratio adjusting means controlled by said auxiliary detector to adjust the relative magnitudes of the received signal and the synthetic signal as may be required to keep their difference negligibly small, so that the magnitude-selective detectors will not be affected by such difference.

4. A voltage source; coupling means between the voltage source and a common transmission means, said coupling means having a plurality of branches controlled by different telegraph keys and each designed to produce a different increment of voltage at the common terminals when the corresponding key is operated; transmission means to reproduce at a distant point the total voltage applied to its input terminals through said coupling means; a plurality of polarized voltage detectors at the distant point; sources of bias voltage for these detectors, said bias voltages corresponding to the voltage increments controlled by the keys at the sending end of the system; switching means controlled by each voltage detector whereby the bias applied to each detector responsive to a smaller increment of voltage is altered to compensate for the effect of any increment to which the larger-voltage detector responds; an auxiliary polarized voltage detector actuated by the difference between the received voltage and the sum of the compensating voltages controlled by the detectors previously mentioned; and voltage-ratio adjusting means controlled by said auxiliary detector whereby it adjusts the relative magnitude of the received voltage and the compensating voltages as required to keep negligibly small the average difference voltage tending to actuate said auxiliary detector.

5. In multiplex communication systems where the channels are distinguished by quantum-size differences, receiving and translating equipment comprising the following parts: a cathode ray tube with a target electrode, means for producing an electron beam and directing its path, and a mask interposed in the path of the beam to allow passage to the target only at certain positions where apertures are provided; means for receiving an incoming signal pulse and storing its peak magnitude as an electric quantity; means for deflecting the beam in accordance with this stored quantity, thereby directing the beam toward a spot on the mask in line with a row of apertures whose positions along the row correspond to the quanta composing the received signal pulse; means for deflecting the beam to scan that row in a predetermined time after storage of the aforementioned quantity; means for bringing out the pulse of target current produced when the beam passes an aperture; means for distributing such pulses to separate output terminals according to position of the apertures along the row scanned; means for extinguishing the beam while restoring the initial state of the deflecting means, and means for discharging the stored quantity in preparation for the next received signal.

6. In multiplex teletypewriter systems, transmitter apparatus comprising the following: a pair of relays for each key of each channel; a distributor cyclically activating each key in turn; connections such that when a depressed key is activated by the distributor its pair of relays operate in sequence; a holding circuit through the distributor, connected by the first relay to keep itself operated for its allotted time even if the key is released sooner; an interlock between circuits of corresponding keys and first relays in all channels, to prevent operation of one relay late in the operated period of another; a holding circuit through the depressed key, connected by the second relay to hold itself operated until the key is released; an interlock circuit disconnecting the first relay from the key when the second is operated, thereby preventing repeated operation if the key remains depressed more than one distributor cycle; and a further relay for each channel, operable by action of the first relay of any pair in the same channel, with contacts connecting one branch of a voltage dividing network wherein branches controlled by different channel relays produce different-sized voltage changes at the common terminals of a transmission means.

7. In a multiplex telegraph system of the type in which various magnitude-selective detectors respond to different-sized quanta composing the received signal, means for automatic adjustment to compensate for possible variations in transmission loss, said means comprising the following: switching means connected to a local power source and controlled by the magnitude-selective detectors to build up a synthetic signal equal to the received signal normally required to actuate those detectors; an auxiliary polarized detector actuated by the difference between the received signal and this synthetic signal; and voltage-ratio adjusting means controlled by said auxiliary detector to adjust the relative magnitudes of the received signal and the synthetic signal as may be required to keep their difference neligibly small, so that the magnitude-selective detectors will not be affected by such difference.

8. In a multiplex telegraph system of the type mentioned in claim 1, where various magnitude-selective detectors respond to different-sized quanta composing the received signal, means for automatic adjustment to compensate for possible variations in transmission loss, said means comprising the following: switching means connected to a local power source and controlled by the magnitude-selective detectors to build up a synthetic signal equal to the received signal normally required to actuate those detectors; an auxiliary polarized detector actuated by the difference between the received signal and this synthetic signal; and voltage-ratio adjusting means controlled by said auxiliary detector to adjust the relative magnitudes of the received signal and the synthetic signal as may be required to keep their difference negligibly small, so that the magnitude-selective detectors will not be affected by such difference.

MEGUER KALFAIAN.
ROBERT EDWIN McCOY.

REFERENCES CITED

The following references are of record in the file of this patent:

UNITED STATES PATENTS

| Number | Name | Date |
| --- | --- | --- |
| 2,313,209 | Valensi | Mar. 9, 1943 |
| 2,556,975 | Oberman | June 12, 1951 |